3,763,197
ORGANO-METALLIC COMPOUNDS
Michael R. Collier, Hurstpierpoint, England, Bernard M. Kingston, Radyr, near Cardiff, Wales, and Michael F. Lappert and Margaret M. Truelock, Brighton, England, assignors to National Research Development Corporation, London, England
No Drawing. Filed July 14, 1970, Ser. No. 54,866
Claims priority, application Great Britain, July 17, 1969, 36,021/69
Int. Cl. C07f 7/00
U.S. Cl. 260—429.3   35 Claims

ABSTRACT OF THE DISCLOSURE

Organo-metallic compounds of the general formula:

$$L_nM[CY_m(M'R^1R^2R^3)_{3-m}]_r$$

where

M is a transition metal of Group IV-A, V-A, VI-A, VII-A, VIII or I-B of the Periodic Table of the Elements;
M' is carbon, silicon, germanium, tin, or lead;
where M' is carbon, $R^1$, $R^2$, $R^3$ are alkyl or aryl groups and may be the same or different, and where M' is silicon, germanium, tin, or lead, $R^1$, $R^2$ and $R^3$ are alkyl, aryl, alkoxy, or aralkoxy groups or halogen or hydrogen atoms and may be the same or different;
m is 0, 1 or 2;
n is 0 to 4;
$L_n$ is the sum of all other ligands (if any) to the transition metal, which ligands may be the same or different;
Y is hydrogen, or halogen, or an alkyl or aryl group, and when m is 2, the two groups Y may be the same or different;
r is 1 to 4 depending on the available valencies of the transistion metal.

The compounds are useful as catalysts for olefine polymerisation, isomerisation and oligomersation, and for hydrogenation, dehydrogenation, hydroformylation and hydrosilylation reactions.

---

This invention relates to new organo-metallic compounds and to methods for their preparation.

According to the invention, there are provided as new chemical compounds, organo-metallic compounds of the general formula:

$$L_nM[CY_m(M'R^1R^2R^3)_{3-m}]_r$$

where

M is a transition metal of Group IV-A, V-A, VI-A, VII-A, VIII or I-B of the Periodic Table of the Elements:
M' is carbon, silicon, germanium, tin, or lead;
where M' is carbon, $R^1$, $R^2$ and $R^3$ are alkyl or aryl groups and may be the same or different, and where M' is silicon, germanium, tin or lead, $R^1$, $R^2$ and $R^3$ are alkyl, aryl, alkoxy, or aralkoxy groups or halogen or hydrogen atoms and may be the same or different;
m is 0, 1 or 2;
$L_n$ is the sum of all other ligands (if any) to the transition metal, which ligands may be the same or different;
Y is hydrogen, or halogen, or an alkyl or aryl group, and, when m is 2, the two groups Y may be the same or different;
r is 1 or more depending on the available valencies of the transition metal.

The other ligands $L_n$ may, for example, be CO, $R^4R^5R^6P$ (where $R^4$, $R^5$ and $R^6$ are alkyl or aryl groups and may be the same or different), an olefine or acetylene, $C_5H_5$, halogen, or an alkoxy group, or another group of the type $CY_m(M'R^1R^2R^3)_{3-m}$.

It will be seen from the above formula that the new organo-metallic compounds are silicon, germanium, tin, carbon and lead derivatives of methyl or substituted methyl, such as benzyl or halogenomethyl, transistion metal compounds in which one, two or three hydrogen atoms are replaced by $R^1R^2R^3M'$ groups. The carbon derivatives have a neopentyl-type structure.

The new organo-metallic compounds of the present invention are of interest as catalysts, particularly for the vinylic polymerisation of olefines, but also for the isomerisation or oligomerisation of olefines and for hydrogenation, dehydrogenation, hydroformylation and hydrosilylation reactions.

The new organo-metallic compounds of the present invention can be prepared by a salt elimination reaction starting from a halogen or related derivative of the transition metal, in accordance with the following general formula:

$$L_nMX_r + r(R^1R^2R^3M')_{3-m}CY_mM''$$
$$\rightarrow L_nM[CY_m(M'R^1R^2R^3)_{3-m}]_r + rM''X$$

where M, M', $L_n$, $R^1$, $R^2$, $R^3$, Y, r and m have the significance given above, X is halogen or an alkoxy, aralkoxy, or alkyl group; and M'' is Li or MgX, or another non-transition metal of Groups I to IV of the Periodic Table of the Elements, or by a similar reaction starting from an alkali metal derivative of the transition metal, in accordance with the general formula:

$$L_nM.M_r''' + r(R^1R^2R^3M')_{3-m}CY_mX \rightarrow$$
$$L_nM[CY_m(M'R^1R^2R^3)_{3-m}]_r + rM'''X$$

where M, M', $L_n$, $R^1$, $R^2$, $R^3$, Y, X, r and m have the same significance as before; and M''' is Na, K, Li, or MgX.

It will be appreciated that the first reaction may also provide compounds in which all the r halogen atoms in $L_nMX_r$ are not replaced; products then take the form $L_nM[CY_m(M'R^1R^2R^3)_{3-m}]_{r-r'}X_{r'}$, where r' is a smaller integer than r.

Alternatively, the new organo-metallic compounds of the present invention can be prepared by an oxidative addition reaction in accordance with the following general formula:

$$L_nM + (R^1R^2R^3M')_{3-m}CY_mX' \rightarrow$$
$$L_nM(X')[CY_m(M'R^1R^2R^3)_{3-m}]$$

where M, M', $L_n$, $R^1$, $R^2$, $R^3$, Y and m have the same significance as before, and X' is halogen or $$(R^1R^2R^3M')_{3-m}CY_m$$

It will be noted that in this oxidative addition reaction, the product may acquire an additional ligand in the form of a halogen atom.

A further method for the preparation of the new organo-metallic derivatives of the present invention is a salt-elimination process in accordance with the following general formula:

$$L_nM[CY_mX_{3-m}]_r + (3-m)rM''''M'R^1R^2R^3 \rightarrow$$
$$L_nM[CY_m(M'R^1R^2R^3)_{3-m}]_r + (3-m)rM''''X$$

where M, M', $L_n$, $R^1$, $R^2$, $R^3$, Y, X, m and r have the same significance as before; and M'''' is Na, K, Li, ½Mg, or ½Hg.

In some cases, an organo-metallic compound according to the invention containing two or more $$[CY_m(M'R^1R^2R^3)_{3-m}]$$

groups can be converted into the corresponding compound in which at least one of these groups is replaced by another ligand. For example, by reaction with the corresponding hydrogen halide in accordance with the general formula:

$$L_nM[CY_m(M'R^1R^2R^3)_{3-m}]_r + HX \rightarrow L_nM(X)[CY_m(M'R^1R^2R^3)_{3-m}]_{r-1} + HCY_m(M'R^1R^2R^3)_{3-m}$$

one $[CY_m(MR^1R^2R^3)_{3-m}]$ group is replaced by halogen.

Alternative reagents which can cause fission of one or more M—C bonds include alcohols, silanols, nitric acid, carboxylic acids, halogens, and halides of alkali metals, magnesium and alkaline earth metals.

Another example is the metathetical exchange reaction with a transition metal halide, as in $$3Ti(CH_2SiMe_3)_4 + TiCl_4 \rightarrow 4ClTi(CH_2SiMe_3)_3$$

The ligands $L_n$ of the organo-metallic compounds can be replaced, if desired, by other ligands by treatment with appropriate reagents. Addition or elimination products of the new organo-metallic compounds can also be obtained.

It will be appreciated that the particular method used to obtain a specific organo-metallic compound will frequently depend on whether the appropriate starting materials are available. In general, the salt elimination reaction starting with a transition metal halide is most likely to be useful, since such halides are normally available.

As previously stated, the novel organo-metallic compounds of the present invention are of interest as catalysts. For the polymerisation of α-olefines, such as ethylene, propylene, and 1,3-butadiene, derivatives of the early transition metals, e.g. of Group IV of the Periodic Table, are particularly effective, for example, such compounds as $Ti(CH_2SiMe_3)_4$ and $Zr(CH_2SiMe_3)_4$; the important features are a labile M—C bond and vacant co-ordination sites. For the isomerisation and oligomerisation of olefines and for hydrogenation, dehydrogenation, hydroformylation and hydrosilylation reactions, the late transition metal compounds are particularly active, for example the $d^8$ complexes $(Ph_3P)_3RhCH_2SiMe_3$ and $Ni[C(SiMe_3)_3]_2$; vacant co-ordination sites are again of importance and the attainment by the central transition metal of a low co-ordination number, at any rate in solution, is desirable.

The invention is illustrated by the following examples:

EXAMPLE 1

Synthesis of tetrakis(trimethylsilylmethyl) titanium (IV)

A solution of titanium tetrachloride (6.6 ml., 60 mmoles) in n-heptane (25 ml.) was added during 35 min. to a stirred solution of trimethylsilylmethylmagnesium chloride (200 mmoles) in ether (150 ml.) maintained at —30°. The resulting brown mixture was stirred at ca. —25° for 35 min., and was then allowed to warm to 20° with stirring during a further 50 min. Solvents were removed in vacuo. The residue was extracted with 2× 100 ml. n-heptane giving tetrakis(trimethylsilylmethyl)titanium (IV) as a deep red solution in n-heptane, which was fully characterised by infrared and ¹H nuclear magnetic resonance spectra. This preparation, like all the others, was preformed under an atmosphere of pure, dry nitrogen.

EXAMPLE 2

Synthesis of bis(cyclopentadienyl)bis(trimethylsilylmethyl)titanium

To a stirred suspension of bis(cyclopentadienyl) titanium dichloride (0.8668 g.) in diethyl ether (20 ml.) was added dropwise, during 1 hour, a solution of lithiomethyltrimethylsilane (0.71 g.) in diethyl ether (10 ml.). The yellow solution was stirred for a further 20 minutes at 12° and then cooled to 0°. The mixture was stirred for 1 minute with oxygen-free ice-water at 0° and transferred to a cooled separating funnel. The aqueous layer was separated and the chloride ion present was determined gravimetrically as silver chloride (0.9908 g. 100%). The green organic layer was dried over Molecular Sieve (Type 4A) for 3 hours. The solution, which was now orange, was filtered. Volatile materials were removed from the filtrate at 0.001 mm. giving bis(cyclopentadienyl)-bis(trimethylsilylmethyl)titanium (0.7426 g. 60.5%). Found (C, 61.13; H, 9.53; $C_{18}H_{32}Si_2Ti$ requires C, 61.33; H, 9.15%) as golden yellow needles. Infrared, ¹H N.M.R. and mass spectra confirmed the structure.

EXAMPLE 3

Synthesis of chlorobis(cyclopentadienyl)neopentyltitanium (IV)

To a stirred solution of dichlorobis(cyclopentadienyl)titanium (IV) (8.43 g., 34.4 mmoles) in dichloromethane (50 ml.) maintained at 0° was added dropwise during 60 min. a solution of neopentylmagnesium chloride (29 mmoles) in ether (25 ml.). The mixture was allowed to warm to 20° with stirring during 70 min. Solvents were removed at 0.001 mm. and the brown residue was extracted with n-heptane (2× 50 ml.); the filtered combined n-heptane solutions were concentrated in vacuo and cooled to —20° giving after drying at 0.001 mm. pale brown crystals of chlorobis(cyclopentadienyl)neopentyltitanium (IV) (3.55 g., 43%) M.P. 95°. (Found: C, 62.4; H, 6.9. $C_{15}H_{21}ClTi$ requires C, 63.3; H, 7.4%.)

EXAMPLE 4

Synthesis of bis(cyclopentadienyl)bis(trimethylsilylmethyl)zirconium (IV)

Dichlorobis(cyclopentadienyl)zirconium (IV) (4.94 g., 16.9 mmoles) was added in one portion to a stirred solution of trimethylsilylmethylmagnesium chloride (50 mmoles) in ether (50 ml.) at 20°. The mixture was stirred at 20° for 12 hr. and was then filtered. The residue was extracted with 2× 20 ml. ether and the combined filtrates were freed of solvents at $10^{-3}$ mm. Recrystallisation from n-hexane at —20° gave white needles of bis(cyclopentadienyl)bis(trimethylsilylmethyl)zirconium (IV) (0.30 g., 5%) M.P. 84°–86°. (Found: C, 55.01; H, 8.70. $C_{18}H_{32}Si_2Zr$ requires C, 54.6; H, 8.2%.)

EXAMPLE 5

Synthesis of tetrakis(trimethylsilymethyl) zirconium (IV)

Zirconium tetrachloride (15.51 g., 66.6 mmoles) was added in one portion to a stirred solution of trimethylsilylmethylmagnesium chloride (200 mmoles) in ether (150 ml.) maintained at —40°. The mixture was stirred at ca. —25° for 25 min., and was then allowed to warm slowly to 20° during 70 min. The mixture was stirred at 20° for 1 hour, and then solvents were removed in vacuo. The residue was extracted with 2× 100 ml. n-heptane giving tetrakis(trimethylsilylmethyl)zirconium (IV) as a solution in n-heptane. Upon concentration of this solution in vacuo and cooling to —78°, pale yellow crystals of tetrakis(trimethylsilylmethyl)zirconium (IV) were deposited, fully characterised by infrared and ¹H nuclear magnetic resonance spectra.

EXAMPLE 6

Synthesis of chlorobis(cyclopentadienyl)trimethylsilylmethylzirconium (IV)

To a stirred suspension of dichlorobis(cyclopentadienyl)zirconium (IV) (7.86 g., 26.9 mmoles) in dichloromethane (47 ml.) maintained at 0° was added dropwise during 40 min. a solution of trimethylsilylmethylmagnesium chloride (19.3 mmoles) in ether (15 ml.). The mixture was allowed to warm to 20° with stirring during 90 min. Solvents were removed at 0.001 mm. and the cream-white residue was extracted with n-heptane (2× 50 ml.); the filtered combined n-heptane solutions were concentrated in vacuo and cooled to −20° giving, after drying at 0.001 mm., white crystals of chlorobis(cyclopentadienyl)trimethylsilylmethylzirconium (IV) (1.29 g., 20%) M.P. 112°. (Found: C, 46.82; H, 5.89. $C_{14}H_{21}ClSiZr$ requires C, 48.9; H, 6.15%.)

EXAMPLE 7

Synthesis of bis(cyclopentadienyl)bis(trimethylsilylmethyl)hafnium (IV)

To a stirred solution of dichlorobis(cyclopentadienyl)hafnium (IV) (1.02 g., 2.69 mmoles) in ether (20 ml.) maintained at 0°, was added dropwise during 17 min. a solution of trimethylsilylmethyllithium (7.2 mmoles) in ether (6 ml.). The mixture was allowed to warm to 20° with stirring during 60 min. Solvents were removed at 0.001 mm. and the white residue stirred with n-hexane (40 ml.), and then filtered. The filtrate was concentrated to ca. 10 ml. in vacuo and cooled to −20° for 2 hr., forming white needles. The mother liquor was decanted from the crystals which were dried at 0.001 mm. for 15 min. giving as long white needles bis(cyclopentadienyl) bis(trimethylsilylmethyl)hafnium (IV) (0.65 g., 50%) M.P. 83°. (Found: C, 44.87; H, 6.97. $C_{18}H_{32}HfSi_2$ requires C, 44.75; H, 6.68%.)

EXAMPLE 8

Synthesis of trimethylsilylmethyl (π-cyclopentadienyltricarbonyl)molybdenum (II)

Iodomethyltrimethylsilane (2.74 g., 12.8 mmoles) was added in one portion to a stirred yellow solution of sodium (π-cyclopentadienyltricarbonyl)molybdenum (O) (10.3 mmoles) in tetrahydrofuran (40 ml.) at 20°. The mixture was stirred at 20° for 48 hr. Solvent was removed at 70 mm. The residue was sublimed at 100°/0.5 mm. giving as yellow crystals methyl (π-cyclopentadienyltricarbonyl)molybdenum (II) (0.62 g., 24%) and at 100°/0.005 mm. as a yellow liquid trimethylsilylmethyl (π-cyclopentadienyltricarbonyl)molybdenum (II) (0.09 g., 3%) which was fully characterised by its infrared, nuclear magnetic resonance, and mass spectra.

EXAMPLE 9

Synthesis of trimethylsilylmethyl(π-cyclopentadienyltricarbonyl)tungsten (II)

Iodomethyltrimethylsilane (12.6 ml., 84 mmoles) was added in one portion to a stirred yellow solution of sodium (π-cyclopentadienyltricarbonyl)tungsten (O) (84 mmoles) in tetrahydrofuran (125 ml.) at 20°. The mixture was stirred at 20° for 23 hr. Solvent was removed at $10^{-3}$ mm. and the residue extracted with 3×100 ml. light petroleum (B.P. 40°–60°). The extracts were freed of solvent at $10^{-3}$ mm. giving a yellow-brown oil and some solid material. The oil was filtered and distilled under reduced pressure giving firstly traces of the yellow crystalline methyl (π-cyclopentadienyltricarbonyl)tungsten (II) and then an orange-yellow liquid which slowly crystallised to give yellow crystals of trimethylsilylmethyl (π-cyclopentadienyltricarbonyl)tungsten (II) (19.2 g., 55%) M.P. 32°, B.P. 80° (bath temperature)/0.02 mm. (Found: C, 33.7; H, 3.7; Si, 6.8; W, 43.2. $C_{12}H_{16}O_3SiW$ requires C, 33.9; H, 3.8; Si, 6,6; W, 44.4%.)

EXAMPLE 10

Synthesis of dimethylphenylsilylmethyl(π-cyclopentadienyltricarbonyl)tungsten (II)

Dimethyl(iodomethyl)phenylsilane (4.1 ml., 21.5 mmoles) was added in one portion to a stirred yellow solution of sodium (π-cyclopentadienyltricarbonyl)tungsten (O) (21.5 mmoles) in 1,2-dimethoxyethane (50 ml.) Stirring at 20° was continued for 23 hr., and solvents were removed at $10^{-3}$ mm. The residue was extracted with 4× 50 ml. light petroleum (B.P. 30°–40°). Solvent was removed from the extracts at $10^{-3}$ mm. giving a yellow-brown oil. This oil was chromatographed under nitrogen on an alumina (Spence Grade H) column (2 x 35 cm.) with n-heptane giving one intensely yellow band. This yellow band was collected and freed from solvent at $10^{-3}$ mm. The resulting yellow liquid was dissolved in n-heptane (ca. 20 ml.) and cooled to −20° whereupon lemon-yellow needles of dimethylphenylsilylmethyl π-cyclopentadienyltricarbonyl)tungsten (II) (4.08 gm., 40%) M.P. 47°–49° (Found: C, 42.38; H, 3.82. $C_{17}H_{18}O_3SiW$ requires C, 42.34; H, 3.76%) separated.

EXAMPLE 11

Synthesis of trimethylstannylmethyl(π-cyclopentadienyldicarbonyl)iron (II)

A solution of sodium (π-cyclopentadienyldicarbonyl) iron (O) (6.4 mmoles) in tetrahydrofuran (8 ml.) was added dropwise, during 10 min. to a stirred solution of iodomethyltrimethylstannane (1.95 g., 6.39 mmoles) in tetrahydrofuran (10 ml.) maintained at −78°. The mixture was allowed to warm to room temperature with stirring, during 25 min. The infrared spectrum of the mixture after this period showed the reaction to be >90% complete. Tetrahydrofuran was removed at 0.001 mm. and the residue was extracted with 3× 40 ml. n-hexane, leaving a grey insoluble solid which was shown to be sodium iodide. The extracts were freed of solvent at 0.001 mm. to give a yellow-brown oil which was distilled at 90° (pre-heated bath temperature) and $10^{-4}$ mm. to give an orange liquid. On cooling, this liquid crystallised into long yellow needles which were shown by infrared and N.M.R. measurements to be trimethylstannylmethyl (π-cyclopentadienyldicarbonyl)iron (II) (1.35 g., 60%) M.P. 29°–30°. (Found: C, 37.26; H, 4.62. $C_{11}H_{16}FeO_2Sn$ requires C, 37.24; H, 4.55.)

EXAMPLE 12

Synthesis of trimethylsilylmethyltris(triphenylphosphine) rhodium (I)

To a stirred suspension of chlorotris(triphenylphosphine)rhodium (I) (1.97 g., 2.13 mmoles) in ether (40 ml.) maintained at 0°, was added dropwise during 10 min. a solution of trimethylsilylmethylmagnesium chloride (21 mmoles) in ether (20 ml.). The mixture was stirred at 0° for 24 hours, during which time the suspension changed from red to yellow. The mixture was filtered and washed with ether (50 ml.) giving an orange powder, which on further washing with ether and n-hexane and drying at 0.001 mm. was shown by infrared and $^1$H nuclear magnetic resonance spectra to be trimethylsilylmethyltris(triphenylphosphine)rhodium (I).

EXAMPLE 13

Triphenylphosphine-π-cyclopentadienyl(trimethylsilylmethyl)nickel

To an ice-cooled solution of trimethylsilylmethylmagnesium chloride (20 mmoles, 4-fold excess) in ether (15 ml.) was added dropwise, with stirring, a solution of triphenylphosphine-π-cyclopentadienylnickel chloride (2.11 g., 5 mmoles) in benzene (50 ml.). The resultant solution was dark green. After addition was complete, the mixture was stirred for 2 hr. at room temperature. After hydrolysis by a saturated aqueous solution of ammonium chloride (100 ml.), the organic layer was separated, dried, and solvents were removed. The green solid was dissolved in the minimum of benzene and chromatographed under nitrogen on a 25 cm. alumina column, using hexane as eluent. The volume of the resulting hexane solution was reduced to 40 ml. and the product was recrystallised at −20° to yield triphenylphosphine-π-cyclopentadienyl-(trimethylsilylmethyl)nickel (1.63 g., 69%) as green needles M.P. 121°. (Found: C, 68.65; H, 6.52. $C_{27}H_{31}NiPSi$ requires C, 68.52; H, 6.60%.)

EXAMPLE 14

Bis(diphenyltrimethylsilylmethyl)nickel (II)

Anhydrous nickel bromide (6.17 g., 28.3 mmoles) was added in one portion of a rapidly stirred solution of diphenyl(trimethylsilyl)methyllithium (16 mmoles) in ether:hexane 50:50 mixture (40 ml.) at −78°. The initially bright-red solution immediately darkened. It was slowly warmed to −20° to give a dark-coloured solid residue. Extraction with hexane (3 × 100 ml.) gave bis-(diphenyltrimethylsilylmethyl)nickel (II) as a pink solution in hexane, which was fully characterised by infrared and $^1$H nuclear magnetic resonance spectra.

EXAMPLE 15

Bis[tris(trimethylsilyl)methyl]nickel (II)

An ethereal solution of tris(trimethylsilyl)methyllithium (0.514 mmole, 0.04 M) was cooled to −78°. Anhydrous nickel bromide (0.56 g., 0.257 mmole) was added in one portion of the stirred solution. The grey-green solution became black. The mixture was warmed to −20° during 3½ hr. Solvents were removed at −20°. The residue was extracted at room temperature with light petroleum (B.P. 30–40°) (3 × 100 ml.) to give bis[tris-(trimethylsilyl)methyl]nickel (II) as a brown solution in light petroleum. Upon concentration of this solution in vacuo and cooling to −20° pale brown crystals of the product were deposited, characterised fully by infrared and $^1$H nuclear magnetic resonance spectra.

EXAMPLE 16

Cis-bis(dimethylphenylphosphine)bis(trimethylsilylmethyl)platinum (II)

A rapidly stirred suspension of cis-dichlorobis(dimethylphenylphosphine)platinum (II) (7.32 g., 13.5 mmoles) in benzene (50 ml.) was cooled to 0°. An ethereal solution of trimethylsilylmethyllithium (29.7 mmoles, 10% excess, 0.74 M) was added dropwise during 75 min. The mixture was stirred at 20° for 30 min., then hydrolysed by a saturated aqueous solution of ammonium chloride (50 ml.). Solvents were removed from the dried organic layer to give a pale yellow oil which solidified in vacuo after 2 hr. Crystallisation (cold methanol) gave the product (7.1 g., 81%) as snow-white prims M.P. 51.5–52°. (Found: C, 44.71; H, 7.12. $C_{24}H_{44}P_2PtSi_2$ requires C, 44.63; H, 6.87%.)

EXAMPLE 17

Cis-bis(triethylphosphine)bis(trimethylsilyl methyl)-platinum (II)

A rapidly stirred suspension of cis-dichlorobis(triethylphosphine) platinum (II) (2.36 g., 4.7 mmoles) in benzene (40 ml.) was cooled to 0°. An ethereal solution of trimethylsilylmethyllithium (10.3 mmoles, 10% excess, 0.74 M) was added dropwise during 75 min. The mixture was stirred at 20° for 10 hr. then hydrolysed by a saturated aqueous solution of ammonium chloride (50 ml.). Solvents were removed from the dried organic layer to give an oil which solidified in vacuo after 40 min. Crystallisation (methanol) gave the product (2.31 g., 83%) as colourless prims M.P. 88°. (Found: C, 39.68; H, 8.18. $C_{20}H_{52}P_2PtSi_2$ requires C, 39.63; H, 8.65%.)

EXAMPLE 18

Cis-bis(methyldiphenylphosphine)bis(trimethylsilylmethyl)platinum (II)

To a rapidly stirred suspension of cis-dichloro-bis(methyldiphenylphosphine)platinum (II) (1.1452 g., 1.7 mmoles) suspended in benzene (25 ml.) at room temperature was added an ethereal solution of trimethylsilylmethyllithium (10% excess, 0.28 M solution). Addition was during one hour. The mixture was stirred overnight. After hydrolysis by a saturated aqueous solution of ammonium chloride (50 ml.) the organic layer was separated, washed with water, and dried. Removal of solvents gave the product (1.03 g., 79%) as white crystals M.P. 157° (ethanol). (Found: C, 53.60; H, 6.73. $C_{34}H_{48}P_2PtSi$ requires C, 53.04; H, 6.28%.)

EXAMPLE 19

Cis - bis (triphenylphosphine) bis (trimethylsilylmethyl) platinum (II) and cis-chlorobis(triphenylphosphine)trimethylsilylmethylplatinum (II)

Cis - dichlorobis (triphenylphosphine) platinum (II) (8.42 g., 10.6 mmoles) was suspended in dry benzene (100 ml.). An ethereal solution of trimethylsilylmethyllithium (23.3 mmoles, 10% excess, 0.74 M) was added dropwise, with vigorous stirring, during 3 hr. The mixture was heated to reflux for 15 min., then hydrolysed by a saturated aqueous solution of ammonium chloride (50 ml.). Unreacted dichloride (3.46 g.) was filtered off. Solvents were removed from the organic layer to give an orange oil. This was partly dissolved in light petroleum (30–40°, 250 ml.) and methanol (50 ml.) was added. The insoluble portion was filtered off. Removal of solvent from the filtrate and crystallisation (hexane/toluene) gave cream prisms of cis-bis(triphenylphosphine)bis(trimethylsilylmethyl)platinum (II) (2.61 g., 47% on dichloride consumed) M.P. 154°. (Found: C, 58.93; H, 5.92. $C_{44}H_{52}P_2PtSi_2$ requires C, 59.11; H, 5.86%.) The insoluble portion was recrystallised (hexane/toluene) to yield cis - chlorobis(triphenylphosphine)trimethylsilylmethyl) platinum (II) (1.48 g., 28% on dichloride consumed) as cream-coloured needles M.P. 195°. (Found: C, 57.01; H, 4.72. $C_{40}H_{41}ClP_2PtSi$ requires C, 57.04; H, 4.91%.)

EXAMPLE 20

Cis-chlorobis(dimethylphenylphosphine)trimethylsilylmethylplatinum (II)

Cis - bis(dimethylphenylphosphine)bis(trimethylsilylmethyl)platinum (II) (2.67 g.) was dissolved in dry ether (7 ml.) and cooled to −80°. Hydrogen chloride in dry ether (1:1 stoichiometry, 2.13 M solution) was added dropwise during 15 min. The mixture was left to warm to room temperature. The white precipitate was recrystallised from ether to give an essentially quantitative yield of the product M.P. 101° (Found: C, 40.47; H, 5.73; Cl, 6.18. $C_{20}H_{33}ClP_2PtSi$ requires C, 40.44; H, 5.60; Cl, 6.06%.)

EXAMPLE 21

Cis-chlorobis(triethylphosphine)trimethylsilylmethylplatinum (II)

Cis - bis(triethylphosphine)bis(trimethylsilylmethyl) platinum (II) (2.45 g., 4.05 mmoles) was dissolved in dry ether (10 ml.) and cooled to −80°. Hydrogen chloride in dry ether (1:1 molar ratio, 2.13 M solution) was added dropwise during 20 min. The mixture was left to warm to room temperature. The white precipitate was recrystallised from ether to yield cis-chlorobis(triethylphosphine) trimethylsilylmethylplatinum (II) (2.24 g., 100%) as white crystals M.P. 45°. (Found: C, 34.59; H, 7.43; $C_{16}H_{41}ClP_2PtSi$ requires C, 34.68; H, 7.46%.)

EXAMPLE 22

Trans-chlorobis(dimethylphenylphosphine)trimethylsilylmethylplatinum (II)

A solution of the corresponding cis-complex (3.81 g.) in benzene (25 ml.) was labilised by addition of free dimethylphenylphosphine (0.02 g.). After 30 min., the equilibrium was frozen by addition of bis(dimethylphenylphosphine)dichloro-$\mu,\mu$-dichlorodiplatinum (0.116 g.) in benzene (50 ml.). Solvents were removed and the mixture was redissolved in the minimum of benzene. Chromatography on alumina (60 cm.) with a hexane:ether 80:20 mixture as eluent separated the isomers, the trans-complex being eluted first (1.60 g., 42% isomerisation obtained) M.P. 118° (ethanol). (Found: C, 40.49; H, 5.71%.)

EXAMPLE 23

Cis-bis(dimethylphenylphosphine)trimethylsilylmethyl(nitrate)platinum (II)

Cis - bis(dimethylphenylphosphine)bis(trimethylsilylmethyl)platinum (II) (0.645 g., 1 mmole) was dissolved in ether (7 ml.) and cooled to −80°. Nitric acid (1 mmole) in ether (1.5 ml.) was added dropwise. The mixture was left to warm to room temperature. Ether (10 ml.) was added and the insoluble material was filtered off (0.159 g.). This was shown to be cis-bis(dimethylphenylphosphine)dinitratoplatinum (II). The ether solution was cooled to −20° to deposit cream-coloured crystals of the product (0.31 g., 50%) M.P. 80°. (Found: C, 38.91; H, 5.57; N, 2.26. $C_{20}H_{33}NO_3P_2PtSi$ requires C, 38.71; H, 5.36; N, 2.26%.)

EXAMPLE 24

Trans-bromobis(dimethylphenylphosphine)trimethylsilylmethylplatinum (II)

Trans - chlorobis(dimethylphenylphosphine)trimethylsilylmethylplatinum (II) (0.39 g., 0.65 mmole) was dissolved in acetone (13 ml.) and potassium bromide (3.7 g. 30 mmoles) was added. The mixture was stirred at room temperature for 15 hr. Acetone was removed at room temperature and reduced pressure and the solid residue was dried at 0.01 mm. It was then washed with water (2× 70 ml.). The residue was dried and recrystallised from cold methanol to give the product (0.24 g., 59%) as white crystals M.P. 124°. (Found: C, 36.99; H, 5.37;

$C_{20}H_{33}BrP_2PtSi$ requires C, 37.62; H, 5.21%.)

EXAMPLE 25

Cis-bromobis(dimethylphenylphosphine)trimethylsilylmethylplatinum (II)

Cis - chlorobis(dimethylphenylphosphine(trimethylsilylmethylplatinum (II) 0.2870 g., 0.483 mmole) was dissolved in acetone (10 ml.) Potassium bromide (50 g., 42 mmoles) was added and the mixture shaken for 4 hr. Acetone was removed and washing of the residue with water gave the product M.P. 113° C. (0.2829) g., 92%). It was recrystallised from ethanol. (Found: C, 36.58; H, 5.19%).

EXAMPLE 26

Cis-iodobis(triphenylphosphine)trimethylsilylmethylplatinum (II)

Bis(triphenylphosphine)platinum(stilbene) (0.3848 g., 0.428 mmole) was dissolved in benzene (10 ml.). Iodomethyltrimethylsilane (1.43 g., 6.68 mmoles, 16 fold excess) was added in one portion. The admixture was shaken in the dark for 20 hr. during which time a cream-coloured solid was precipitated. Filtration gave pure product (0.40 g., 25%) M.P. 217°. (Found: C, 51.47; H, 4.52. $C_{40}H_{41}IP_2PtSi$ requires C, 51.45; H, 4.43%.)

EXAMPLE 27

Cis-iodobis(triphenylphosphine)trimethylsilylphenylmethylplatinum (II)

Bis(triphenylphosphine(platinum(stilbene) (0.333 g., 0.370) mmole was dissolved in benzene (10 ml.). Iodomethylphenyltrimethylsilane (1.52 g., 5.26 mmoles, 14 fold excess) was added in one portion. The mixture was shaken in the dark for 7 days during which time some solid was deposited. Filtration yielded the product (0.101 g., 27%) as white crystals M.P. 293°. (Found: C, 54.68; H, 4.42. $C_{46}H_{45}IP_2PtSi$ requires C, 54.71; H, 4.49%.)

EXAMPLE 28

Cis-chlorobis(methyldiphenylphosphine)trimethylsilylmethylplatinum (II)

Cis - bis(methyldiphenylphosphine)bis(trimethylsilylmethyl)platinum (II) (1.120 g., 1.45 mmoles) was dissolved in dry ether (45 ml.) and cooled to −80°. Hydrogen chloride in dry ether (1.45 mmoles, 2.48 M) was added dropwise during 10 min. to the stirred solution. The cooling bath was removed and the mixture left to warm to room temperature (1 hr.) during which time a copious white precipitate was formed. Filtration gave the product (1.03 g., 100%) as white crystals M.P. 172° which were recrystallised from methanol. (Found: C, 49,52; H, 4.81. $C_{30}H_{37}ClP_2PtSi$ requires C, 50.17; H, 5.19%.)

EXAMPLE 29

Cis-bromobis(methyldiphenylphosphine)trimethylsilylmethylplatinum (II)

Cis - (chlorobis(methyldiphenylphosphine)trimethylsilylmethylplatinum (II) (0.3841 g., 0.53 mmole) was dissolved in acetone (10 ml.). Potassium bromide (4.2261 g., 35.2 mmoles) was added. The mixture was shaken for 2 hr. Acetone was removed in vacuo and water (100 ml.) added. The product was filtered off as a white powder (0.35 g., 94%) and recrystallised from methanol M.P. 141°. (Found: C, 46.99; H, 5.11. $C_{30}H_{37}BrP_2PtSi$ requires C, 47.25; H, 4.89%.)

EXAMPLE 30

Cis-bromobis(triphenylphosphine)trimethyl silylmethylplatinum (II)

Cis - chlorobis(triphenylphosphine)trimethylsilylmethylplatinum (II) (0.1646 g., 0.195 mmole) and potassium bromide (5.0 g., 42 mmoles) were shaken in acetone (25 ml.) for 36 hr. Acetone was removed and the residue was washed with water and filtered. Recrystallization from methanol gave the product M.P. 225° (0.0957 g., 56%) as white crystals. (Found: C, 54.24; H, 4.69. $C_{40}H_{41}BrP_2PtSi$ requires C, 54.18; H, 4.66%.)

EXAMPLE 31

Cis-iodobis(triphenylphosphine)trimethylsilylmethylplatinum (II)

Cis - chlorobis(triphenylphosphine)trimethylsilylmethylplatinum (II) (0.230 g., 0.273 mmole) was dissolved in acetone (30 ml.) and sodium iodide (4.0 g., 27 mmoles) was added. The solution immediately turned yellow. After heating to reflux for 20 min. acetone was removed and the cream residue was washed with water (60 ml.) and filtered, to give the product (0.2958 g., 100%) M.P. 217°. It was recrystallised from dichloromethane:hexane. (Found: C, 51.65; H, 4.75.) This product was identical with that obtained by oxidative addition of iodomethyltrimethylsilane to bis(triphenylphosphine)platinum(stilbene) (Example 27).

EXAMPLE 32

Cis-bromobis(triethylphosphine)trimethylsilylmethylplatinum (II)

Cis - chlorobis(triethylphosphine)trimethylsilylmethylplatinum (II) (0.3100 g., 0.559 mmole) was dissolved in acetone (20 ml.). Potassium bromide (5.5 g., 46 mmoles) was added. The mixture was shaken for 30 min. Acetone was removed and water and ether were added. The product was isolated from the dried ether layer and recrystallised from hexane, to give cis-bromobis-(triethylphosphine)trimethylsilylmethylplatinum (II) (0.29 g., 87%) as white prisms M.P. 59°. (Found: C, 32.01; H, 6.80. $C_{16}H_{14}BrP_2PtSi$ requires C, 32.11; H, 6.91%.)

What we claim as our invention and desire to secure by Letters Patent of the United States is:

1. Organo-metallic compounds of the general formula:

$$M[CY_m(M'R^1R^2R^3)_{3-m}]_r$$

where
M is a transition metal of Group IV–A, VI–A or VIII of the Periodic Table of the Elements;

M' is an element of Group IV–B of the Periodic Table of the Elements;

R¹, R² and R³ are lower alkyl or phenyl groups, and may be the same or different;

m is 0, 1 or 2;

Y is hydrogen or a phenyl group, and where m is 2, the two groups Y may be the same or different; and r is 1 to 4 inclusive depending on the available valencies of the transition metal M.

2. Organo-metallic compounds of the general formula:

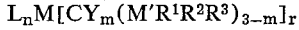

where

M is a transition metal of Group VIII of the Periodic Table of the Elements;

M' is an element of Group IV–B of the Periodic Table of the Elements;

R¹, R² and R³ are lower alkyl or phenyl groups and may be the same or different;

m is 0, 1 or 2;

$L_n$ is the sum of ligands selected from the group consisting of halogen, nitrate, cyclopentadienyl, carbonyl groups, or substituted phosphine groups of the formula $R^4R^5R^6P$, where $R^4$, $R^5$ and $R^6$ are lower alkyl or phenyl groups, and may be the same or different;

Y is hydrogen or a phenyl group, and where m is 2, the two groups Y may be the same or different; and r is 1 to 4, inclusive depending on the available valencies of the transition metal M.

3. Organo-metallic compounds of the general formula:

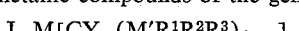

where

M is a transition metal of Group IV–A of the Periodic Table of the Elements;

M' is an element of Group IV–B of the Periodic Table of Elements;

R¹, R² and R³ are lower alkyl or phenyl groups, and may be the same or different;

m is 0, 1 or 2;

$L_n$ is the sum of ligands selected from the group consisting of halogen and cyclopentadienyl;

Y is hydrogen or a phenyl group, and where m is 2, the two groups Y may be the same or different; and r is 1 to 4 inclusive depending on the available valencies of the transition metal M.

4. Tetrakis(trimethylsilylmethyl)titanium (IV) as claimed in claim 1.

5. Bis(cyclopentadienyl)bis(trimethylsilylmethyl)titanium (IV) as claimed in claim 3.

6. Chlorobis(cyclopentadienyl)neopentyltitanium (IV) as claimed in claim 3.

7. Bis(cyclopentadienyl)bis(trimethylsilylmethyl)zirconium (IV) as claimed in claim 3.

8. Tetrakis(trimethylsilylmethyl)zirconium (IV) as claimed in claim 1.

9. Chlorobis(cyclopentadienyl)trimethylsilylmethylzirconium (IV) as claimed in claim 3.

10. Bis(cyclopentadienyl)bis(trimethylsilylmethylhafnium as claimed in claim 3.

11. Trimethylsilylmethyl(π-cyclopentadienyltricarbonyl)molybdenum (II).

12. Trimethylsilylmethyl(π-cyclopentadienyltricarbonyl)tungsten (II).

13. Dimethylphenylsilylmethyl(π - cyclopentadienyltricarbonyl)tungsten (II).

14. Trimethylstannylmethyl(π - cyclopentadienyldicarbonyl)iron (II), as claimed in claim 2.

15. Trimethylsilylmethyltris(triphenylphosphine)rhodium (I), as claimed in claim 2.

16. Triphenylphosphine - π - cyclopentadienyl(trimethylsilylmethyl)nickel (II), as claimed in claim 2.

17. Bis(diphenyltrimethylsilylmethyl) nickel (II), as claimed in claim 1.

18. Bis[tris(trimethylsilylmethyl)]nickel (II), as claimed in claim 1.

19. Cis - bis(dimethylphenylphosphine)bis(trimethylsilylmethyl)platinum (II), as claimed in claim 2.

20. Cis-bis(triethylphosphine)bis(trimethylsilylmethyl)platinum (II), as claimed in claim 2.

21. Cis - bis(methyldiphenylphosphine)bis(trimethylsilylmethyl)platinum (II), as claimed in claim 2.

22. Cis - bis(triphenylphosphine)bis(trimethylsilylmethyl)platinum (II), as claimed in claim 2.

23. Cis - chlorobis(triphenylphosphine)trimethylsilylmethylplatinum (II), as claimed in claim 2.

24. Cis-chlorobis(dimethylphenylphosphine)trimethylsilylmethylplatinum (II), as claimed in claim 2.

25. Cis-chlorobis(trimethylphosphine)trimethylsilylmethylplatinum (II), as claimed in claim 2.

26. Trans - chlorobis(dimethylphenylphosphine)trimethylsilylmethylplatinum (II), as claimed in claim 2.

27. Cis - bis(dimethylphenylphosphine)trimethylsilylmethyl(nitrate)platinum (II), as claimed in claim 2.

28. Trans-bromobis(dimethylphenylphosphine)trimethylsilylmethylplatinum (II), as claimed in claim 2.

29. Cis - bromobis(dimethylphenylphosphine)trimethylsilylmethylplatinum (II), as claimed in claim 2.

30. Cis-iodobis(triphenylphosphine)trimethylsilylmethylplatinum (II), as claimed in claim 2.

31. Cis-iodobis(triphenylphosphine)trimethylsilylphenylmethylplatinum (II), as claimed in claim 2.

32. Cis - chlorobis(methyldiphenylphosphine)trimethylsilylmethylplatinum (II), as claimed in claim 2.

33. Cis-bromobis(methyldiphenylphosphine)trimethylsilylmethylplatinum (II), as claimed in claim 2.

34. Cis - bromobis(triphenylphosphine)trimethylsilylmethylplatinum (II), as claimed in claim 2.

35. Cis - bromobis(triethylphosphine)trimethylsilylmethylplatinum (II), as claimed in claim 2.

References Cited
FOREIGN PATENTS
1,142,016  2/1969  Great Britain.

OTHER REFERENCES
Mironov et al.: Chem. Abstracts, 59 (1963), cols. 15,300–1.

Dannels et al.: J. Org. Chem., 22 (1957), pp. 748–750.

Connolly et al.: Inorg. Chem., 2 (1963), pp. 645–6.

Sommer et al.: J. Am. Chem. Soc., 76 (1954), pp. 1619–20.

HELEN M. S. SNEED, Primary Examiner

U.S. Cl. X.R.

252—431 R, 431 N, 431 P; 260—429 R, 429.5, 429.7, 430, 437 R, 438.1, 438.5 R, 439